April 22, 1924.

A. HOUSSIERE ET AL

GLASS DRAWING MACHINE

Filed April 1, 1922  2 Sheets-Sheet 1

1,491,749

Inventor
Arthur Houssiere
Jules Houssiere

By Mason, Fenwick & Lawrence

Patented Apr. 22, 1924.

1,491,749

UNITED STATES PATENT OFFICE.

ARTHUR HOUSSIERE AND JULES HOUSSIERE, OF LANCASTER, OHIO.

GLASS-DRAWING MACHINE.

Application filed April 1, 1922. Serial No. 548,693.

*To all whom it may concern:*

Be it known that we, ARTHUR HOUSSIERE and JULES HOUSSIERE, citizens of the United States, residing at Lancaster, in the county of Fairfield and State of Ohio, have invented certain new and useful Improvements in Glass-Drawing Machines; and we do hereby declare the following to be a full, clear, and exact description of the invention, such as will enable others skilled in the art to which it appertains to make and use the same.

This invention relates to new and useful improvements in the art of glass making and more particularly to glass drawing, the main object of the present invention being the provision of a novel machine for drawing sheet glass directly from the melting furnace.

A further object of the invention is the provision of a glass drawing machine particularly adapted for drawing sheet glass in the shape of a rectangle having slightly rounded corners whereby two narrow sheets and two substantially wide sheets of glass can be drawn simultaneously, the rounded corners serving as a guide for separating the several sheets.

A still further object of the invention is the provision of a glass drawing machine comprising a holder supporting a carriage provided with an inner and outer jaw member, the inner jaw member being preferably stationary with respect to the carriage while the outer jaw members are suitably mounted upon the carriage for movement toward and away from the inner jaw member whereby the jaw members are inserted into the molten glass in an open position and the outer jaw members then moved toward the inner jaw members for clamping a portion of the glass between the jaws to provide a starter for the glass whereby a slow movement of the carriage upwardly will draw the glass from the molten tank in an even layer.

A still further object of the invention is the provision of a glass drawing device having movable outer jaws suitably mounted so that they can be readily swung away from the inner jaws for inserting the bait member into the molten glass and then readily closed onto a portion of the glass completing the baiting whereby the glass can be drawn from the molten tank in a comparatively even sheet.

With the above and other objects in view, the invention consists in the novel features of construction, combination and arrangement of parts hereinafter more fully set forth, pointed out in the claims and shown in the accompanying drawings, in which:

Figure 1:
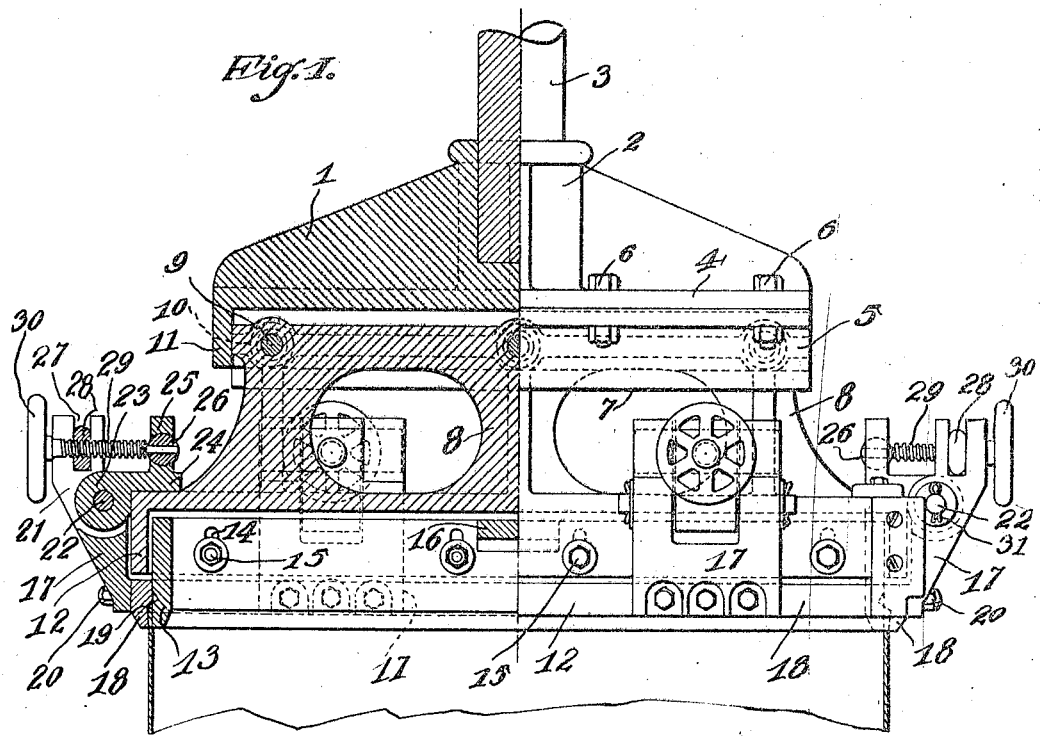
Figure 1 is a side elevation, parts being broken away and illustrated in cross section.

In carrying out our invention, we provide a holder as indicated at 1, said holder being preferably provided with a socket portion 2 into which is fitted one end of a shaft 3, said shaft being attached to the holder for the purpose of raising and lowering the device as required.

The holder 1 is provided with outstanding flanges as at 4 and arranged beneath these flanges are the Z-shaped bracket members 5, each having one of their horizontal portions attached to the flanges 4 by means of the bolt 6. These brackets are preferably arranged along the longitudinal edges of the holder 1 with their lower horizontal portions 7 extending inwardly beneath the holder toward each other to form spaced trackways as clearly illustrated in Fig. 3. A carriage member 8 is suspended beneath the holder 1 by having transverse shaft members 9 extended through the upper portion of the carriage with rollers 10 mounted upon opposite ends of these shafts and bearing upon the lower horizontal portion 7. One end of the trackway is closed by means of a downwardly depending flange 11 so as to limit the longitudinal movement of the carriage when suspended beneath the holder.

Figure 2:
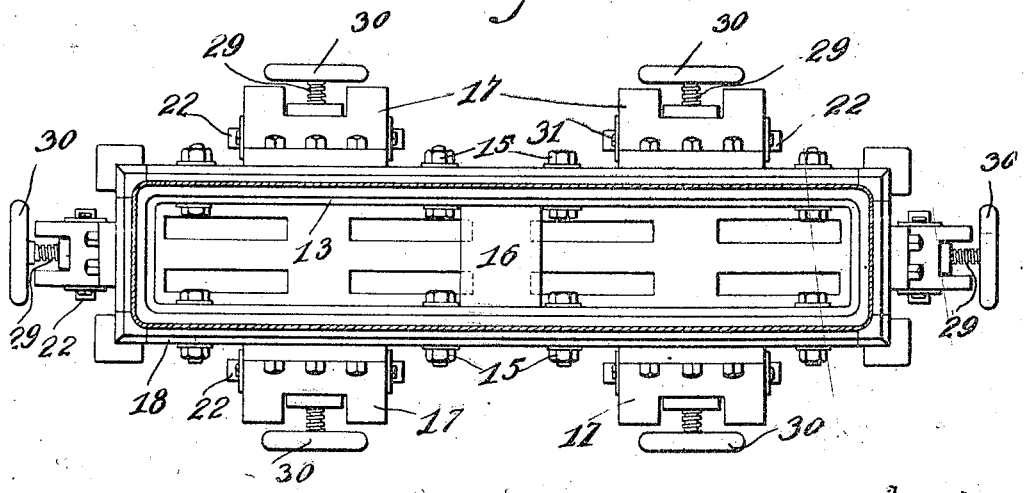
Fig. 2 is a bottom plan view.

The carriage member 8 is provided with downwardly depending flange portions 12 forming a substantially rectangular pocket within which the inner jaw members 13 are disposed, the jaw members being provided with slots 14 movable upon the bolts 15 carried by the depending flanges 12 whereby to secure the jaw members 13 in various relative positions. The movable jaw members are preferably connected by means of a central plate 16 as illustrated clearly in Figs. 1 and 2.

The outer jaw members which are indicated at 17 are provided with clamping faces 18 having suitable cutaway portions 19 whereby to receive a portion of the molten glass to clamp the same against the inner jaws 13. The clamping faces 18 are bolted to the outer jaws 17 by means of bolts 20. The outer movable jaws 17 are provided with spaced ears 21, said ears being provided with suitable openings to receive the pivot pin 22 supported within the eye 23 which is attached to the carriage 8. This point 23 is attached to the carriage by means of a bracket 24 having an upstanding flange 25 provided with an arcuate opening to receive the ball member 26. As several of these brackets 24 are provided along the side and end walls of the carriage the construction of all of these brackets are the same throughout so that the particular description of one will be sufficient for the purpose of illustration.

The spaced ears 21 are bifurcated at their upper ends to form the slots 27 adapted to receive the arms 28 carried by the screw 29 which is connected with the ball member 26. From this it will be apparent that upon turning movement of the screw member 29 the upper end of each of the outer jaws 17 will be moved inwardly toward the upstanding flanges 25, moving the clamping faces 18 away from the inner jaws 13 and upon rotating the screw 29 in the opposite direction, the clamping faces 18 will be moved towards the inner jaws as the ears 21 will be moved away from the upstanding flanges 25. In order to provide for manipulation of the screw members 29 suitable hand wheels 30 are connected with the outer ends of these screw members. Attention is also called to the fact that the pivot pins 22 are retained in place by means of the cotter pins 31, although any fastening means may be used for this purpose.

Figure 3:
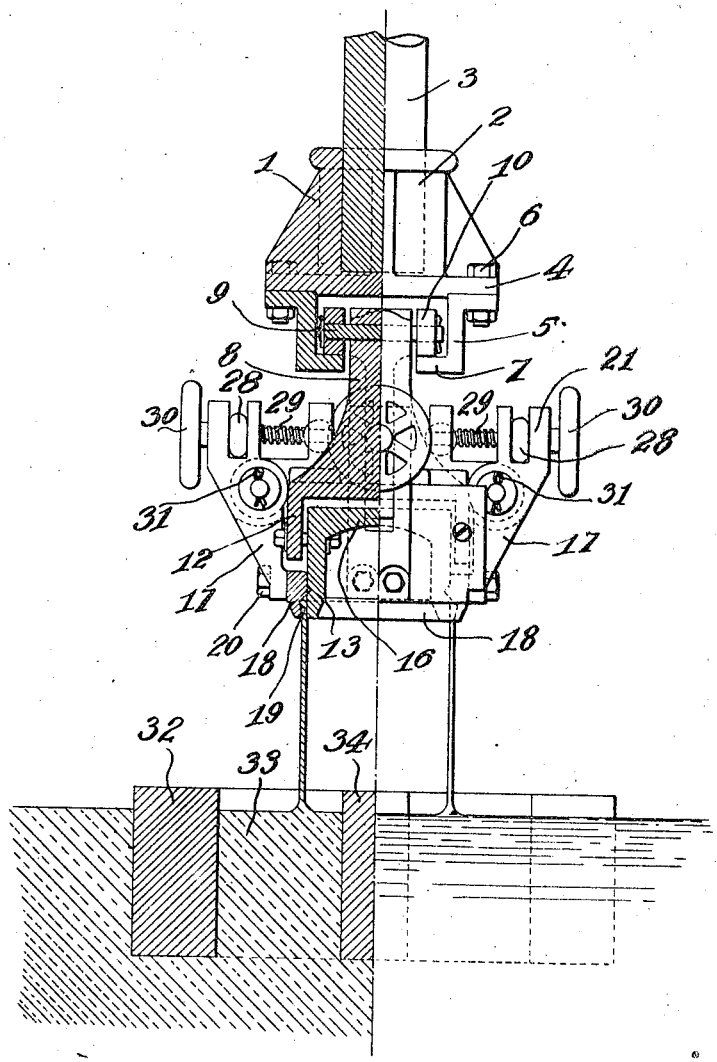
Fig. 3 is an end elevation illustrating the operation of the device, parts of the same being broken away and illustrated in cross section.

In the art of glass making floaters such as the type illustrated in Fig. 3, and indicated at 32, are used for separating the thoroughly molten glass from the entire contents of the tank, the superior quality of glass being located upon the interior of the floater and indicated at 33. In the present instance, we have illustrated a double cell floater with the partition 34, the partition being preferably connected to the end walls of the floater at the lower edge so as not to interfere with the end portions of the jaws 13 and 17 when drawing glass from this floater.

In the operation of our improved device, the clamping faces 18 are moved away from the jaws 13 and the device lowered until the lower edges of the two jaws are submerged within the glass within the floater, the clamping faces 18 are then moved toward the jaws 13 in order to clamp the proper amount of glass between these two jaws so that when the device is moved upwardly the proper amount of glass will adhere or stick to the glass which has been clamped between the jaws whereby upon continued upward movement of the carriage, the proper amount of glass will be withdrawn from within the floater 32 as illustrated in Fig. 3. It will be apparent from the construction set forth above that when the carriage is raised to its proper height, a suitable amount of glass will have been withdrawn from the floater to provide a predetermined size for the glass and the lower edge can be separated from the molten glass in any suitable manner, thus leaving a substantially rectangular shell. The end portions of this shell are then cutaway by separating the sides from the ends at the rounded corners, the side portions being retained and transferred to the tempering ovens prior to cutting these large sheets into smaller sheets if desired.

A plurality of openings 50 are formed in the top of the bait to permit the heat to escape from the enclosure of the bait, and natural air from the inside to enter, to cool the glass to the proper point to hold the same in proper sheet form while being drawn. A suitable slidable cover may be provided for regulating the effective sizes or areas of the openings 50 so that the temperature may be adjusted and regulated as desired.

From the above description, it will be apparent that we have provided a simple and efficient device for drawing sheet glass from molten tanks which can be operated with a minimum amount of skill and at the same time will draw glass from the tank at the proper thickness by having the clamping jaws arranged so that the proper amount of glass will be clamped between these jaws prior to drawing the glass.

While we have illustrated only the main embodiment of the device, it will be understood that various types of operating means can be utilized for raising and lowering the device and moving the same about from place to place.

We claim:

1. A glass drawing machine including a supporting holder, a movable carriage member supported by said holder, a stationary jaw member mounted upon the carriage and movable jaw members supported upon the carriage and threaded means for imparting movement to the movable jaw members whereby to move the same toward and away from the stationary jaw members.

2. A glass drawing machine including a holder, spaced horizontal track-ways carried by said holder, a carriage suspended from said holder, rollers mounted upon the carriage and engaging said track-ways, stationary jaw members mounted upon the carriage, movable jaw members supported upon the carriage and adjustable means whereby to move the movable jaw members toward and away from the stationary jaw members.

3. A glass drawing machine including a holder comprising a body, spaced horizontal flanges suspended beneath said holder and extending longitudinally of the same, a carriage, rollers upon the carriage for engagement with the track-ways whereby to movably mount said carriage upon the holder, a substantially rectangular member detachably connected to said carriage comprising stationary jaw members, movable jaw members mounted upon the carriage and adjustable means whereby to move the movable jaw members toward and away from the stationary jaw members.

4. A glass drawing machine including a holder, a carriage movably suspended from said holder, stationary jaw members detachably connected to the carriage and mounted for adjustment thereon, movable jaw members supported by the carriage and adapted to be moved toward and away from the stationary jaw members, screw members loosely connected with the carriage and having engagement with the movable jaws whereby adjustment of said screw members will move the movable jaws toward and away from the stationary jaws.

In testimony whereof we affix our signatures.

ARTHUR HOUSSIERE.
JULES HOUSSIERE.